Oct. 27, 1953     E. M. CARBARY     2,656,577
ATTACHING CLIP
Filed Jan. 13, 1950
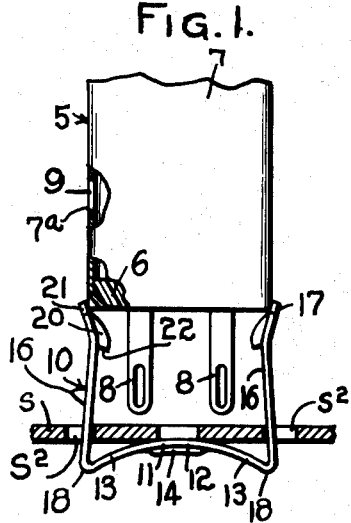
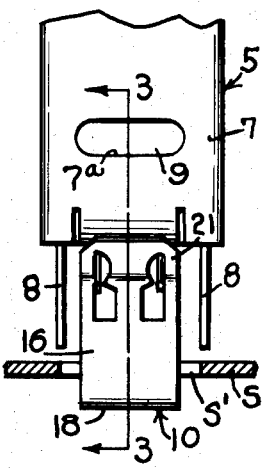
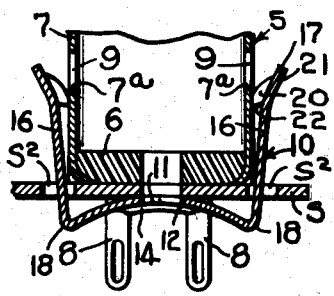
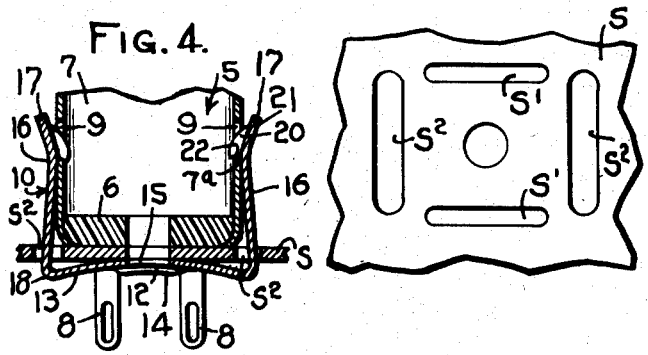
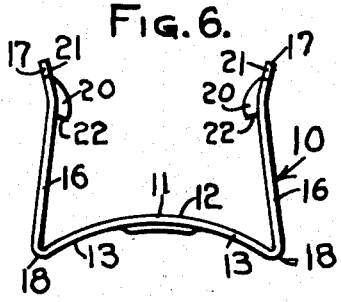
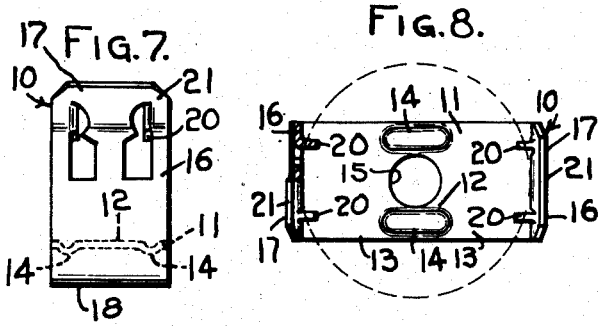
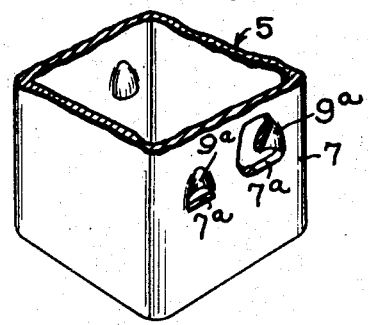
INVENTOR:
EDWARD M. CARBARY,
By Philip E. Parker
ATTORNEY.

Patented Oct. 27, 1953

2,656,577

UNITED STATES PATENT OFFICE 2,656,577

ATTACHING CLIP

Edward M. Carbary, South Acton, Mass., assignor to United-Carr Fastener Corporation, Cambridge, Mass., a corporation of Massachusetts Application January 13, 1950, Serial No. 138,451

1 Claim. (Cl. 24—73)

The present invention relates to attaching clips for removably securing an apertured supporting member to an apertured support, and aims generally to improve and simplify existing attaching clips of this type.

In many fields of industry it is desirable to secure an elongated member that may be provided with apertures or recesses in the sides thereof, in upright position on a support. One example of such installation is in the manufacture of electronics apparatus wherein a pronged electrical appliance, for example metal shielded transformer or inductance coils, condensers and the like, are supported in upright position on an apertured support, for example the chassis of the apparatus. In such installations it is desirable to provide an attaching clip which may be readily assembled with the apertured support and which will lockingly engage and releasably hold the pronged electrical appliance securely in upright position to maintain the pronged appliance in proper electrical contact with its co-mating socket part.

A primary object of the invention is the provision of an improved attaching clip that may readily be assembled from one side of an apertured support to lockingly engage and hold a supported member securely in upright position on an opposite side of the support.

A further object of the invention is the provision of an improved attaching clip suitable for installations of the type above described and which will more securely hold the supported member on the support against accidental displacement.

The above and other objects of the invention will be readily apparent to persons skilled in the art to which the invention relates from a consideration of the accompanying drawings and annexed description illustrating and describing one preferred embodiment of the invention.

In the drawings:

Fig. 1 is a side elevation of an improved attaching clip and a fragmentary portion of a part to be supported shown in pre-connected position relative to an apertured support which is illustrated in section;

Fig. 2 is a side elevation, partly in section, of the parts illustrated in Fig. 1 as viewed from a side at right angles to Fig. 1;

Fig. 3 is a vertical sectional view taken on the line 3—3 of Fig. 2 of the attaching clip, support and supported member in assembled secured relation and prior to final secured position;

Fig. 4 is a vertical sectional view similar to Fig. 3 but showing the clip and supported member in secured locked relation;

Fig. 5 is a plan view of a fragmentary portion of an apertured support suitable for the reception of the attaching clip and pronged appliance shown in Figs. 1 to 4;

Fig. 6 is an enlarged side elevation of the improved attaching clip;

Fig. 7 is an end elevation thereof;

Fig. 8 is a top plan view of the clip shown in Figs. 6 and 7, the supporting member engaging legs of the clip being shown in relation to a cylindrical member diagrammatically illustrated in dashed lines; and Fig. 9 is a perspective view of a portion of a supported member illustrating a modified form of clip-receiving aperture.

In the accompanying drawings I have illustrated a clip suitable for securing a supported member 5, such as a pronged electrical appliance, to an apertured support S, as for example a sheet metal chassis plate of an electronic apparatus. Such electrical appliances 5 usually include a base portion 6 supporting the parts of the condenser, transformer coil or tube (not shown) as the case may be, and the parts are frequently enclosed in a metal casing or can 7 supported on the base for shielding the parts from electrical interference. In cases where the supported member is a pronged electrical appliance, as herein illustrated, the base is provided with a plurality of depending terminal prongs or contacts 8 suitably electrically connected to electrical parts of the appliance, and in the illustrated embodiment the blades 8 may be arranged in pairs or sets, depending from opposite sides of the base 6 and designed to be passed through openings S' in the support S.

The improved attaching clip 10 of the present invention is preferably of general U-shape configuration and is advantageously formed from a substantially flat strip of resilient sheet material, for example thin strip steel. The bight portion 11 of the U-shaped clip 10 is preferably inwardly bowed as illustrated in Fig. 6, and is preferably provided with a central, rigid support-engaging portion 12 and angularly extending end portions 13. Increased rigidity of the central support-engaging portion 12 of the bight 11 may be effected by downwardly pressed reinforcing ribs 14 adjacent opposite edges of the bight portion and extending substantially throughout the length of the central support-engaging portion 12. These ribs 14 materially stiffen the support-engaging portion for the proper functioning of the clip, as hereinafter described, to such extent as to permit aperturing the support-engaging portion, as at 15, when desired or when necessary to accommodate a central depending part (not shown) on the base portion 6 of the supported member 5.

The casing or shield 7 of the supported member 5 is preferably provided with opposed clip-receiving apertures 9 formed in the casing 7 at a desired predetermined distance above the base 6. The apertures 9 may be of any desired size and shape so long as they present an exposed edge 7a for engagement by the clip. One form of aperture 9 is shown in Fig. 2 and consists of elongated slots cut in opposite side walls of the casing 7 and presenting an exposed casing edge 7a. Another form of apertured casing is illustrated in Fig. 9 wherein the casing wall may be slitted and the metal above the slit pressed or dimpled inwardly, providing recesses 9a above the casing edge 7a.

The leg portions 16 of the clip are provided with outwardly flared terminal ends 17, and preferably in the plane of minimum width of the clip, with inwardly directed hook-shaped wings or lugs 20 adapted for locking engagement with the casing edge 7a of the supported member 5. These wings are advantageously formed by slitting the metal of the body of the legs, at least along one side and bending the wings inwardly so that they are disposed in planes substantially normal to the plane of the legs 16. The upper edges of the wings are preferably so shaped as to provide cam surfaces 21 in continuation of the inner faces of the outwardly flared terminal ends 17 to facilitate passing the wings 20 and legs 16 over the peripheral edge of the base 6 of the member 5. Advantageously the lower edge of the wings 20 is hook-shaped at 22 so as to lockingly engage the edge 7a of the casing 7.

The support S may be of any suitable type and construction. Preferably it is provided with opposed elongated openings $S^2$ through which the legs 16 of the clip may be passed. When the clip is to be used for holding a pronged appliance 5 as illustrated, having contact prongs 8, the support may be provided with additional opposed openings S' intermediate and at right angles to the openings S' through which the prongs 8 may be passed, as illustrated in Fig. 5.

The improved attaching clip and the supported member may be assembled with the apertured support S by being applied thereto from opposite sides as shown in Figs. 1, 2, 3 and 4. Preferably the clip is initially assembled with the underside of the support S with its leg portions extending through the apertures $S^2$ to a position above the support. The member 5 may then be assembled with the clip and support, the outwardly flared ends 21 of the legs 16 permitting the opposed walls of the member 5 to be slipped between the hook-shaped wings 20 of the leg portions 16. In this position (see Fig. 3) the central base portion 12 of the clip is in bearing engagement with the support, and the hook-shaped wings are in bearing engagement with the wall of the casing 7 slightly below the openings 9 thereof.

The parts thus preliminarily assembled may be secured together in locked assembly as shown in Fig. 4, by applying upward pressure to the ends of the bight portion, preferably at the fillets 18, to flex the end section 13 of the bight portion relative to the central rigid portions 12 and move the legs 16 upwardly and inwardly in convergent direction until the hook-shaped wings 20 may snap into the apertures 9 in the casing 7 of the part 5. The inward movement of the legs 16 as above described places them under increased tension so that when the hook-shaped wings 20 snap over the exposed edges 7a of the casing wall aperture 9 they will securely lock the parts together against accidental displacement.

Although I have illustrated and described a preferred embodiment of the invention, I do not intend to be restricted to the details thereof as the scope of the invention is best defined in the appended claim.

I claim:

A spring metal clip of substantially U-shape for attaching an apertured supported member to an apertured support comprising, an intermediate inwardly bowed bight portion for engaging the underside of a support, opposed legs inclined inwardly towards each other extending upwardly from the ends of the bight portion for insertion into spaced apertures in a support member, the terminal ends of said legs being flared outwardly and having opposed wings extending inwardly from said terminal ends, the upper edges of said wings being inclined downwardly from the outwardly flared ends of the legs to provide camming surfaces therewith to spread the legs upon insertion of the legs into the apertures of an apertured support and upon application of the clip to opposite walls of a supported member, the lower edges of the wings facing the bight portion extending at an acute angle to said legs to provide locking shoulders for engagement with the edges of apertures in the opposite walls of an apertured supported member.

EDWARD M. CARBARY.

References Cited in the file of this patent

UNITED STATES PATENTS

| Number | Name | Date |
|---|---|---|
| 2,193,951 | Van Uum | Mar. 19, 1940 |
| 2,216,219 | Wiley | Oct. 1, 1940 |
| 2,329,688 | Bedford | Sept. 21, 1943 |
| 2,467,604 | Tinnerman | Apr. 19, 1949 |
| 2,531,911 | Johnson | Nov. 28, 1950 |